Jan. 19, 1937.   H. ROSENBERG   2,068,075
APPARATUS FOR NUT MAKING
Filed May 19, 1932   4 Sheets—Sheet 1

Inventor:
HEYMAN ROSENBERG
By Edgar M Kitchin,
his Attorney.

Jan. 19, 1937.  H. ROSENBERG  2,068,075
APPARATUS FOR NUT MAKING
Filed May 19, 1932  4 Sheets-Sheet 2
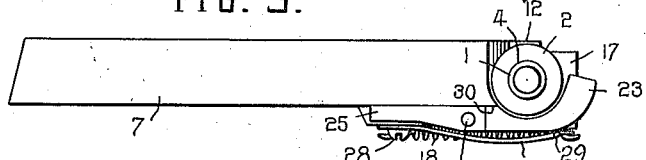
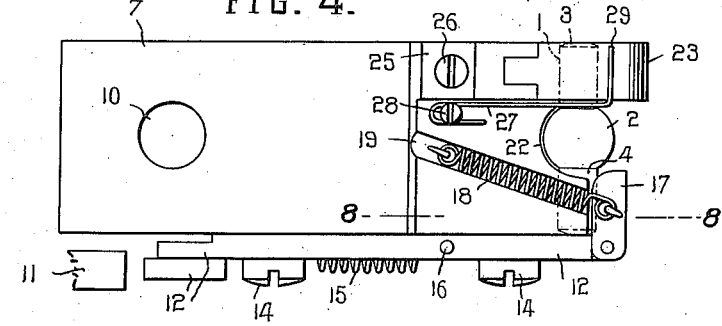
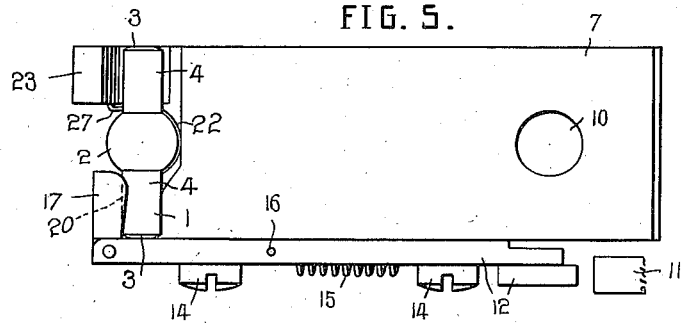
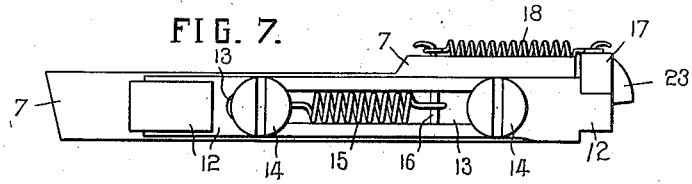
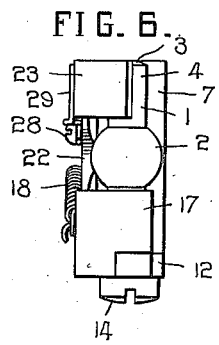
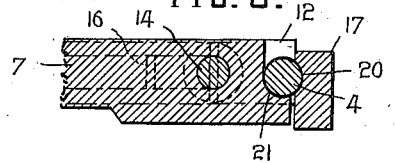
Inventor:
HEYMAN ROSENBERG
By Edgar M Kitchin,
his Attorney.

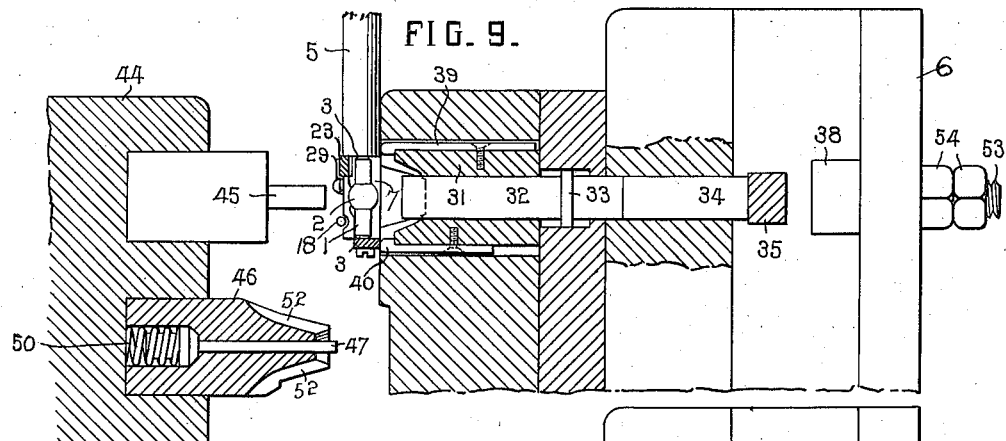
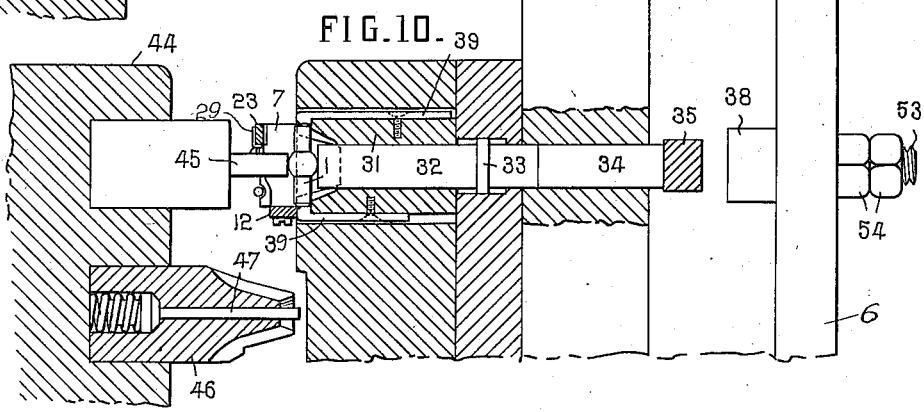
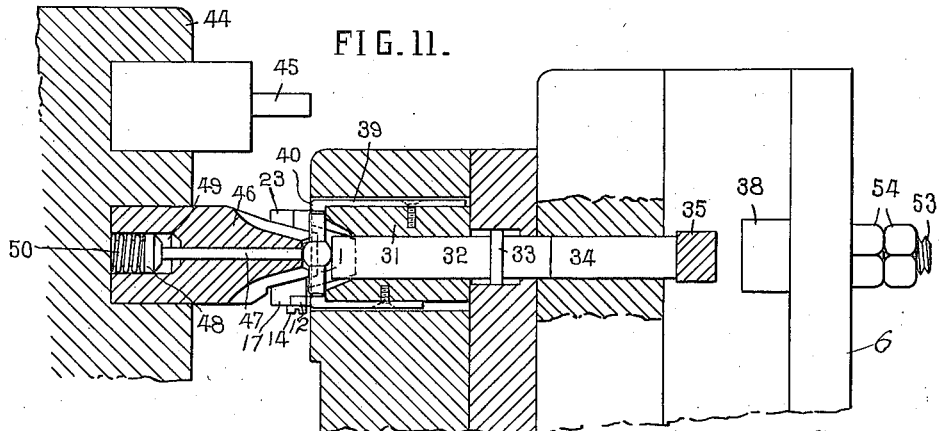

Jan. 19, 1937.  H. ROSENBERG  2,068,075
APPARATUS FOR NUT MAKING
Filed May 19, 1932  4 Sheets-Sheet 4
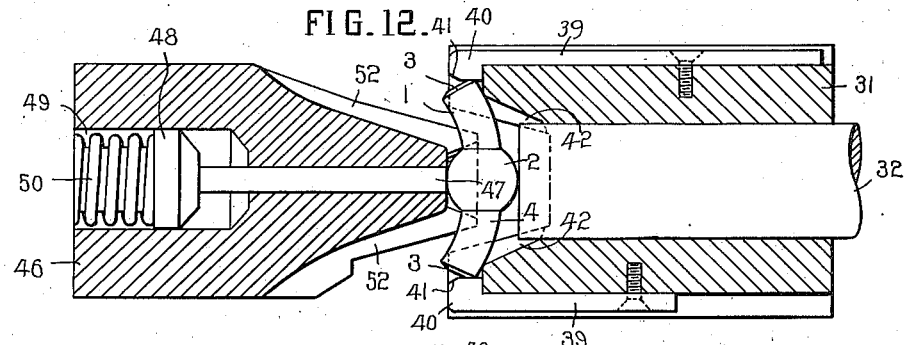
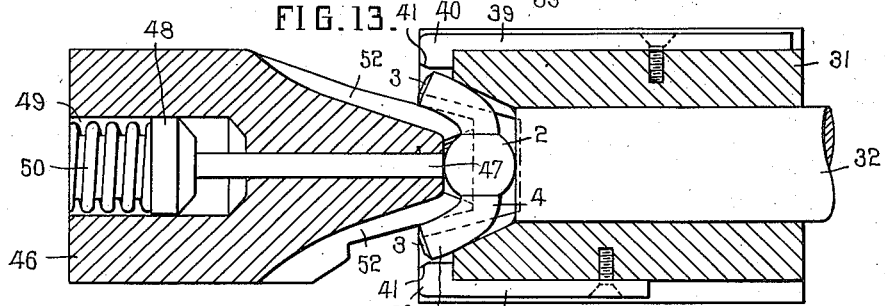
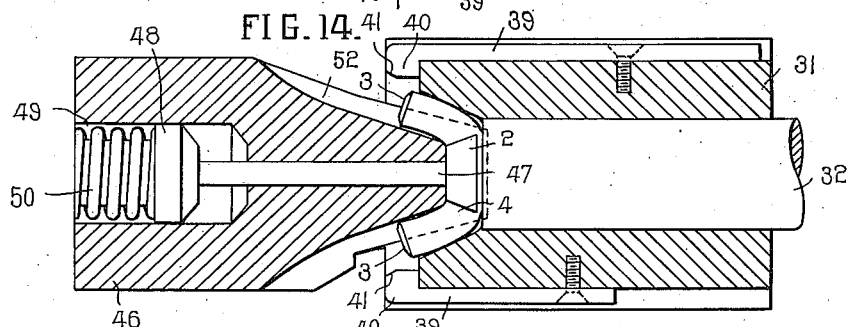
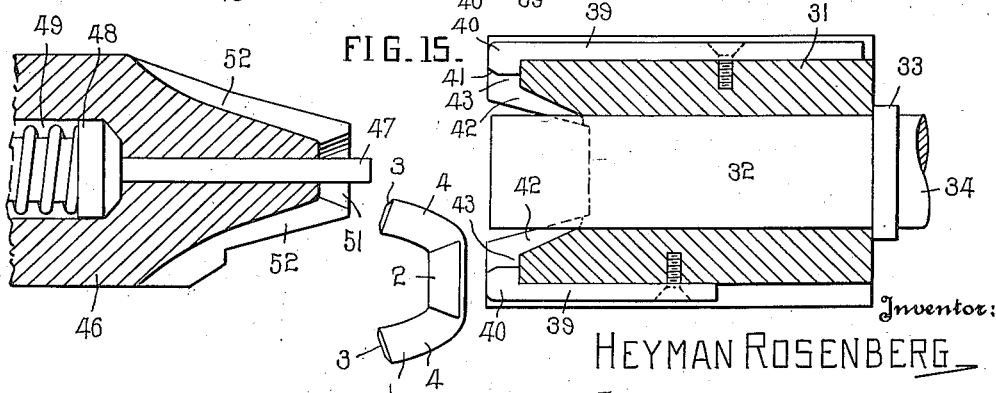
Inventor:
HEYMAN ROSENBERG
By Edgar M Kitchin
his Attorney.

Patented Jan. 19, 1937

2,068,075

UNITED STATES PATENT OFFICE 2,068,075

APPARATUS FOR NUT MAKING

Heyman Rosenberg, New York, N. Y.

Application May 19, 1932, Serial No. 612,327

24 Claims. (Cl. 10—166)

In the art of manufacturing wing nuts from wire, it has heretofore been proposed, as exemplified in the patent to Roy H. Smith, No. 948,616, dated February 8, 1910, to form wing nuts from drawn steel wire by cutting the wire into short sections, subjecting the sections to longitudinal pressure from both ends and producing an intermediate bulbous enlargement, bending the end portions at the sides of the enlargement into laterally-extending position relative to the enlargement, somewhat flattening the enlargement, then flattening the rod end portions to the condition of finished wings, and finally perforating the enlargement and threading it.

The present invention has as its essential object the improvement of the art of producing such wing nuts, and, among other things, provides for more rapid handling and forming the wing nut, better shaping of the body of the nut and improvement in the condition of the metal fiber for increasing the strength and stability of the nut.

A further and more detailed object is the automatic feeding of the nut blanks to the forming dies.

A still further object is the employment of a standard header instead of a stamping machine such as has been heretofore employed.

Incident to the last-named object, a further object is saving expense and labor.

The method heretofore proposed for the forming of wing nuts has involved the use of a stamping machine which requires the constant attention of an operator, and if more than one machine is operated an operator for each must be provided; whereas, according to the present improved process, when practiced by the use of a standard header equipped with the present improved attachments, one operator will be able to successfully attend a battery of headers. As many as twelve headers may be cared for by one operator, and the production on each header will be found to be very substantially greater than that of which an ordinary stamping machine is capable.

Furthermore, the operations of the header in the practicing of the presented improved process produce smoother, finer, and in every respect nicer looking work than can be obtained from the operations of a stamping machine.

According to the present invention, the pieces or sections of wire comprising the nut blanks are first compressed to produce the bulbous enlargement at the middle, and are then fed automatically to cooperating dies arranged in a standard header which transform the blank into an advanced state of the completely shaped nut except that the body is unperforated and the wings are not flattened.

More specifically, the present invention includes, after ductility-increasing treatment of the nut blanks subsequent to the formation of the bulbous, middle enlargement apparatus for locating the blanks in an upright position and compressing them between forming dies, and bringing them to the final shape of the non-perforated nut blank with non-flattened wings.

An advantage in the vertical or upright position of the blank as it begins to be compressed between the dies resides in the fact that automatic feeding to the operative relation between the dies is thereby facilitated.

The invention comprises certain novel combinations of parts, and attachments for standard headers for enabling the headers to accomplish such treatment of nut blanks.

Other objects and the details of construction preferred will become apparent hereinafter.

In the accompanying drawings,—

Figure 3 is a plan view or edge view of the carrier for the blanks, the parts being seen in the position after a blank has been received and the carrier moved a short distance toward the forming dies.

Figure 4 is a view in side elevation of the rear face of the carrier of Figure 3, the clamping jaw releasing stop being seen fragmentarily.

Figure 5 is a similar view of the same with the front face shown.

Figure 6 is an end view of the parts as seen in Figures 3, 4, and 5.

Figure 7 is an inverted plan or edge view thereof.

Figure 8 is a longitudinal, horizontal section taken on the plane indicated by line 8—8 of Figure 4, parts being broken away.

Figure 9 is a vertical, longitudinal section through a header equipped with the present improved attachments, the carrier being in the position in line with the receiving die and with the placer punch, the punch being retracted or in the position advancing toward the blank for seating it in the receiving die.

Figure 10 is a similar view of the same with the placer punch in the position just completing the seating movement of the blank within the receiving die.

Figure 11 is a similar view of the same with the parts of the header in the position of the second stroke and the movable die just beginning its engagement with the blank.

Figure 12 is a similar section of the dies alone and their immediately cooperating parts, the dies being in the position with the movable die advanced slightly beyond the position of Figure 11.

Figure 13 is a view similar to Figure 12 with the movable die in the farthest advanced position toward the receiving die just prior to the beginning of the shaping of the body of the nut.

Figure 14 is a similar view of the same with the movable die in its finally seated position in engagement with the nut blank and receiving die, the blank being in its completed position so far as treated according to the present improved apparatus and art.

Figure 15 is a similar view of the same with the movable die retracted and the completed blank released.

Figure 1:
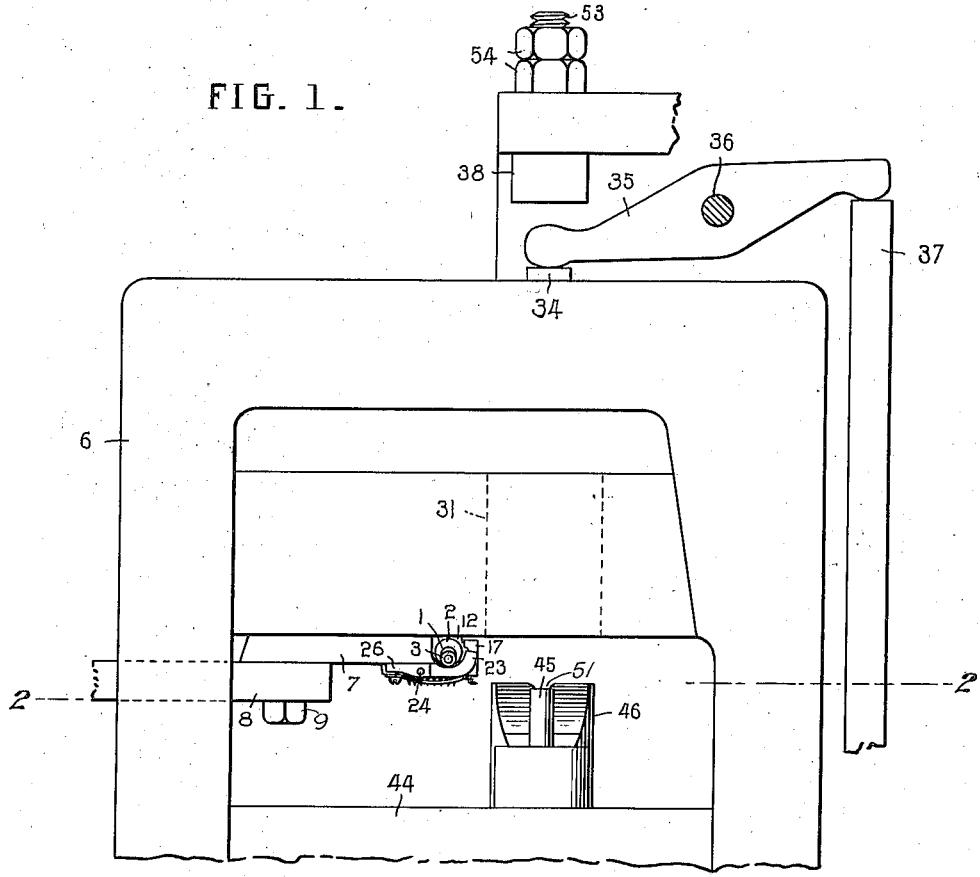
Figure 1 is a top plan view of the present improved attachments shown in their cooperative relation in a standard header, the parts being seen in top plan and the feeder tube being omitted.

The nut blank 1 formed of a section of wire compressed longitudinally to a bulbous, intermediate enlargement 2 is prepared substantially as heretofore proposed, but the compression is preferably accomplished in a standard header suitably equipped. The blank, however, is preferably formed with slightly beveled or rounded ends 3, 3. The bulbous enlargement 2 is preferably located in the middle or midway of the length of the blank, and the projecting portions 4, 4, of the wire or rod will be referred to as the wing portions for convenience, since they are eventually to be shaped into and comprise the wings of the nuts. The bulbous enlargement 2 will, for convenience, also be called the body portion, since it is eventually shaped into and comprises the body of the nut.

The blank thus prepared is preferably carefully annealed to render the blank, and particularly the body 2, as ductile as practicable, and to relieve the blank from the fiber strains which occur incident to reaching a more compact or cold-flowed position under compression. Thus, the blank is better conditioned to withstand the strains of further cold-flowing into the new contour, and particularly the shearing strains at the places of the bends of the wing portions at the base or enlarged part of the nut.

The blank thus prepared is stored in quantities in a feeding tube 5, which is attached to a standard header indicated generally by the reference numeral 6, but which is not a part of the standard equipment of the header 6. The tube 5 is a part of the organized attachments making up a part of the present invention, and it is by virtue of the employment of the tube 5 that the fully automatic feeding of the blanks is made possible. It should be understood that the header 6 is one designed particularly for use in the heading of rivets, or it may be used, according to standard equipment, for heading screws, nails, or other headed fasteners, and with appropriate equipment may be employed for producing the nut blank 1 in its condition with the bulbous enlargement 2.

The tube 5 is suitably attached by a bracket or other appropriate securing means, not illustrated, to the framework of the header 6, and is arranged with the lower end of the tube disposed as close to the upper edge of a carrier 7 as may be without frictional engagement therewith, so that during travel of the carrier the lowermost blank in tube 5 will rest by gravity against the upper edge of the carrier 7. The carrier 7 is of special construction and is seen in detail in Figures 3 to 8.

The standard header is provided with a reciprocating bar 8 arranged transversely of the frame of the machine for reciprocating a carrier for blanks to enable the carrier to move the blanks into operative relation with respect to the heading die. The means by which power is delivered to the rod 8 is well known, and may consist of an appropriate sliding cam or other operative device actuated in timed relation to the other parts of the machine in the manner well understood.

The carrier 7 is connected to and reciprocated by the rod 8, the connection being preferably in the form of a detachable bolt 9 extending through an aperture 10 in the body of the carrier 7. A stop 11 is carried by the frame of the header 6 in position to interrupt return movement of a bar 12 slidingly mounted against the under edge of the main plate of carrier 7. As seen in Figure 7, the slide bar 12 is slotted, at 13, and bolts 14, 14 anchor the bar to the under edge of the main plate of carrier 7 while leaving the bar free to slide for the distance represented by the length of the slot 13 in excess of the distance between bolts 14. A spring 15 is anchored at one end of the rear bolt 14 and at the other end to a cross bar 16 fixed to the slide bar 12 within the slot 13. Spring 15 is tensioned to retract the bar 12, that is, move it toward the position seen in Figures 3 to 8. To the forward end of the slide bar 12 is pivoted a clamping jaw 17, which is engaged by a retractile spring 18 connected at one end to the jaw 17, and at the other end to the main plate of the carrier 7, so as to tend to retain the jaw 17 in the closed position of Figures 3 to 8. To provide a space for the spring 18 and avoid undue occupation of lateral space, the main plate of carrier 7 may be grooved as indicated at 19. The rear face or operative face of the jaw 17 is preferably slightly grooved or recessed longitudinally, as at 20, to accommodate a wing portion of a blank, and the body of the main plate of carrier 7 is notched and rounded, as at 21, opposite to the groove 20 to enable the jaw 17 to snugly clamp the lower end portion of a blank therebetween. The notch 21 is laterally open toward that face of the main plate of carrier 7 which is nearer the receiving die. The main plate of the carrier 7 above the rounded recess or notch 21 is formed with an open notch 22 exposing the body 2 of the blank when the blank is mounted in the carrier, and above the notch 22 a guiding finger 23 is arranged laterally of the line of the notch 21. The finger 23 is preferably pivoted at 24 to a plate 25 detachably fixed, as by an appropriate bolt 26, to the main plate of carrier 7. The finger 23 is rounded to correspond to and preferably slightly larger than the curvature of the largest diameter of the bulbous enlargement 2. An appropriate spring 27 is preferably fixed, at 28, to the main plate of the carrier 7, and has a free end portion 29 located to stress the finger 23 toward the blank within the carrier. The finger 23 at the place of pivotal connection is provided with a flattened portion 30 disposed to engage the adjacent face of the main plate of carrier 7, so as to be retained thereby against having the finger move under the stress of spring 27 over into the path of a descending blank.

Figure 2:
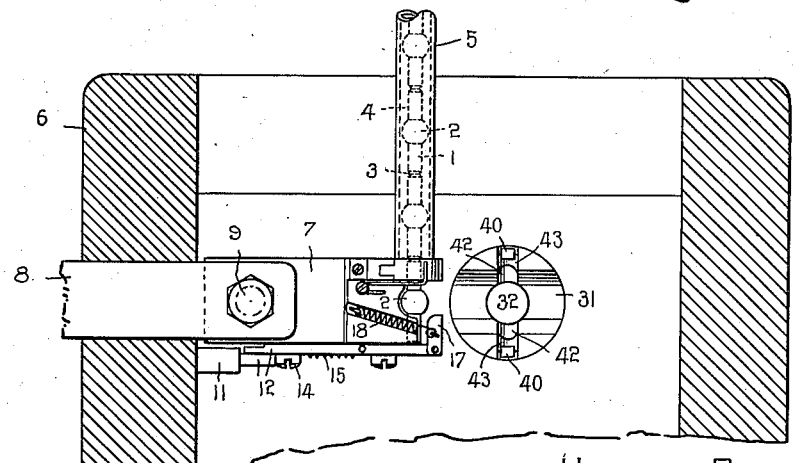
Figure 2 is a vertical section taken on the plane indicated by line 2—2 of Figure 1, parts being seen in elevation including a fragment of the feeder tube.

The parts are so proportioned that when the carrier 7 is retracted, the slide 12 will strike the stop 11 just before the carrier reaches its final retracted position, and the further movement of the main portion of the carrier will effect a relative action, leaving the slide 12 with the jaw 17 spaced from its clamping position, as plainly seen in Figure 2. As the parts reach this position, a blank drops by gravity from tube 5 until its lower end strikes the upper face of slide 12. The upper end will support the next higher blank within tube 5 until carrier 7 moves across the tube sufficiently for having the end of the blank rest on the edge of the carrier. The beveling or rounding off 3 of the end of the blank assures against any tendency to hang against the approaching edge of the carrier 7 as the carrier moves across and relative to the lower end of the tube 5. When the blank drops into position against the slide plate 12, it descends past the finger 23 and frequently arrives in a slightly tilted position, as indicated in Figure 1, with the upper arm of the blank resting against the finger 23. Movement of the bar 8 for advancing the carrier 7 toward the position of the delivery of the blank to the dies allows the main part of the carrier to catch up with the jaw 17. In other words, the movement of the slide 12 away from stop 11 allows the springs 15 and 18 to act to move the jaw 17 to the clamping position with respect to the blank seen in Figures 3 to 8. This movement causes the groove 20 to snugly receive the lower arm 4 of the blank, and the gripping action is sufficient to straighten the blank to an upright position. In other words, the blank is brought to a snugly seated condition in the groove 20 and in the recess 21, and thus is caused to upstand vertically instead of leaning or tilting a little as when it first dropped into the carrier. Thus, the blank assumes the position out of contact with the finger 23, as seen plainly in Figures 3 and 9.

Arranged laterally of the retracted location of the carrier 7, and rigidly mounted in the frame of the header 6, is a receiving or internal die 31. The die 31 is bored axially and an ejector anvil plunger 32 is reciprocably mounted therein. The plunger 32 is preferably provided with a guiding head 33 slidingly mounted in an appropriate recess in the frame of the header 6, and the outer end of plunger 32 is engaged by a controlling, slidingly-mounted plunger 34. The outer end of plunger 34 engages the usual lever 35, which is a part of the standard equipment of the header 6, and is pivoted, at 36, and has its opposite end engaged by a push rod 37, which is connected to the source of power or main drive shaft of the machine, as by an eccentric or otherwise, to impart the required impulses or strokes to the push rod for causing the lever 35 to remain in engagement with plunger 34 and cause the required movements of plunger 34 and the ejector anvil 32. The rod 37 is timed to allow the lever 35 to swing back under the advancing pressure of the plungers 32 and 34 until the lever strikes a block 38 carried by the frame of the header 6 to receive the final shaping stresses of the body of the nut, and to thereby cause the plunger 32 to function as an anvil during the body-shaping operation of the cooperating or moving die. The die 31 preferably carries clamping fingers or springs 39, 39, which may, of course, be otherwise mounted, and each of which is preferably provided with an overhanging lug or projection 40 extending beyond the die and located to snugly receive the ends of the nut blank after the manner seen in Figure 10. As plainly seen in Figures 12 and 15, each of the overhanging lugs 40 is preferably beveled, at 41, to facilitate movement of the blank between the clamping fingers 39. It will be observed that the bevels 3 of the ends of the blank also cooperate with the bevels 41 so as to allow the blank to be wedged between the fingers 39 and to be firmly clamped therebetween and held in proper location while awaiting the further operation. The die 31 is grooved at 42, 42, to correspond in cross section with the cross section of the wings of the nut blank, which latter are usually cylindrical so that the grooves 42 are usually semi-circular in cross section. The grooves 42 taper toward the base of the main recess of the die 31 so as to correspond with the desired relative location of the wing blanks in the completed blank, and the grooves 42 preferably extend outward radially of the die, at 43, so that the lugs or clamping end portions of fingers 39 lie within the outer terminals of the grooves, and, therefore, when the blank is clamped between the fingers 39 its terminal portions are within the grooves of the receiving die.

The header 6 is provided with the well known double stroke plunger head 44 which carries the placer punch 45 and the reciprocating or moving die 46. Both are rigidly carried by the plunger head 44, and the punch 45 is preferably arranged above the die, but, of course, any preferred arrangement may be made according to the sequence of reciprocation of the plunger head 44.

The die 46 is also axially bored, and a knockout pin 47 is mounted and reciprocates therein. The rear end portion of the pin 47 is preferably enlarged, at 48, and slides in an appropriate recess 49 within die 46. A coiled spring or other appropriate cushioning means 50 surrounds the pin 47 and engages the enlarged portion 48 of pin 47 so as to stress the pin toward the ejecting position. The pin is proportioned in length to be located, when fully retracted, with its rearmost enlarged end resting against the wall of the plunger head 44, or some other appropriate non-giving part, and the outer end of the pin 47 lies at the base of a frusto-conical recess 51 formed in the outer extremity of the die 46. Die 46 has its operative outer end portion a frustum of a wedge and the recess 51 is located in the truncated terminal of the wedge. Forming grooves 52, 52 communicate at the sides (top and bottom) of the recess 51, and thence extend backward along the inclined or wedge-shaped sides of the die. The recess 51 has the tapered contour of the conventional wing nut body, and the grooves 52 are transversely shaped to correspond with the cross section of the wings of the nut blank, and are, therefore, ordinarily substantially semi-circular in cross section, so that, when the moving or reciprocating die fully enters the stationary die, as seen in Figure 14, the grooves 52 will cooperate respectively with the grooves 42 to substantially snugly accommodate the wings of the nut blank, it being understood, of course, that a sufficient clearance is allowed to accommodate the slightly arcing contour which the nut blank wings assume in being bent to the laterally outstanding position, as seen plainly in Figure 14.

In the forming of the nut blank according to the present invention, the blank with its bulbous enlargement drops, as above stated, into the carrier 7, and the carrier then moves forward from the position seen in Figure 2 past the position seen in Figures 3 to 8 to the position seen in Figures 9 and 10. As the carrier reaches the position of Figure 9, where the blank is held by the carrier in a vertical position in line with the grooves 42 and 43, the placer punch 45 is moving toward the blank, as seen in Figure 9, and strikes and moves it laterally, as seen in Figure 10, into position with the ends of the blank clamped between the fingers 39. Then the plunger head 44 retracts and shifts upward, and then advances with the second stroke. This movement of the plunger head 44 is according to standard practice and is well understood by those familiar with the construction of headers and header operations. The second forward stroke occurs with the die 46 in line with the blank. As the plunger head was moving to its upper position, the rod or bar 8 was also being retracted, so that the carrier 7 is brought back to receive a new blank for the next cycle of operation as the die 46 is advanced to complete the first cycle of operation. The action of the die 46 is well depicted in Figures 11 to 15 in moving to the blank-shaping operation and withdrawing therefrom. The die approaches the blank until the rounded part of the bulbous enlargement 2 contacts with the base of the recess 51, or substantially contacts therewith, which usually means that the bulbous enlargement is resting against the ejector plunger 47. The die 46 then further advances toward the die 31, as seen in Figure 12, and begins to enter the main recess of die 31, causing the blank to begin to curve the wing terminals. As the die 46 begins to force the blank into the die 31, the anvil plunger 32 recedes under the pressure of the blank, and the movement of the push rod 37 is such as to allow the lever 35 to swing as required to permit this advance movement of the blank. The driving parts for the push rod 37 may be proportioned to allow the lever 35 to slightly resist the advancing movement and thus keep the parts in close contact, so that there will be no looseness during the forming action. However, when the end of the plunger 32 reaches the position at the base of the main recess of die 31, the lever 35 will have reached contact with the block 38, and the end of the plunger 32 engaged by the blank then becomes an anvil cooperating with the dies in compelling the blank to take the new contour impressed thereon by the dies. It should be noted that the block 38 may be and preferably is carried by an adjusting bolt 53 retained by lock nuts 54 in any given position, so that the block 38 may be adjusted to insure the proper reaction to enable the end of the plunger 32 to serve effectively as an anvil.

The further advance of the die 46 from the position seen in Figure 13 causes the body or bulbous enlargement of the blank to effect a cold-flowing operation until the recess 51 is filled and the arms or wings of the blank assume their final position with respect to the body. Thus, the parts reach the position seen in Figure 14. When this is achieved the die 46 begins to retract and the plungers 32 and 47 function to eject the blank and allow it to drop free of the dies, as seen in Figure 15, and, with this completed, the next cycle of operation progresses with the placing of another blank in the line of the placer punch 45.

The material used for the blanks may, of course, be of any appropriate material, such as iron and steel, brass and alloys, and any other available material. Annealing is done where the material used requires greater ductility than originally present.

While the dies 31 and 46 have been shown with the grooves 42 and 52 of such a depth as allows the wings of the blank to assume and retain a slightly arcuate form, as plainly seen in Figure 14, it will be obvious that such arcuate form could readily be eliminated and the wings 4 straightened by merely lessening the depth of the grooves 42 and 52 sufficiently to allow advance of die 46 adequately into die 31 to effect the straightening operation. Naturally, the parts controlling the anvil plunger 32 would need to be adjusted to accommodate this slight additional movement.

What is claimed is:—

1. In wing-nut forming mechanism, the combination, with wing-nut forming dies for forming wing-nuts from blanks each of which blanks has a bulbous intermediate portion and lateral projections extending therefrom, and means for sustaining and relatively moving the dies for producing wing-nuts, of means for receiving, transporting, and delivering such wing-nut blanks to said dies in timed relation to the movements of the dies and with each of the blanks supported in that cooperating registering alinement of its several parts with respect to the dies enabling direct action of the dies thereon as the blank is delivered, said last-named means comprising a reciprocable carrier and a resilient releasable clamp for gripping a lateral projection of a blank.

2. The combination as claimed in claim 1 wherein the die sustaining and actuating means is a header.

3. The combination as claimed in claim 1 wherein provision is made of means for successively feeding nut blanks to the carrier.

4. The combination as claimed in claim 1 wherein provision is made of a tube for successively feeding nut blanks to the carrier.

5. The combination as claimed in claim 1 wherein provision is made of means for successively feeding nut blanks to the carrier by gravity.

6. The combination as claimed in claim 1 with means for gravity feeding wing-nut blanks to the resilient clamp of the reciprocating carrier.

7. In a wing-nut forming apparatus, the combination of a shaping die, a movable die cooperating with the first-mentioned die, and means carried by the first-mentioned die and cooperating therewith for resiliently clamping a wing-nut blank in operative relation to the last-mentioned die, said clamping means being located and adapted for sustaining a blank in cooperation with the first-mentioned die independently of and in cooperative relation with respect to the second-mentioned die.

8. The combination as claimed in claim 7 wherein the clamping means comprises spaced springs having inclined portions adapted to enable the wing-nut blank to be forced between and move the springs in the direction of moving apart for enabling the springs to frictionally grip the blank.

9. A carrier for wing-nut blanks comprising a main plate, a clamping jaw bodily sustained by and carried by the main plate and cooperating with the main plate to form a blank embracing clamp for clamping blanks, means for bodily shifting the main plate between receiving and discharging positions, means guiding the jaw for relative bodily movement toward and from the main plate in the directions of movement of the main plate, and means urging the jaw toward the main plate but yieldable to permit separation of the jaw from the main plate in the receiving and discharging positions to facilitate longitudinal feeding of the wing-nut blanks into the clamp and lateral discharging of the blanks from the clamp.

10. The combination as claimed in claim 9 wherein a longitudinally reciprocating slide is movably connected to the main plate and resilient means are provided to cause the jaw to effect a clamping action and the slide is adapted to be moved against such resilient means to release the clamping action.

11. In a wing-nut forming mechanism, the combination, with a standard header plunger and a header framework carrying the same, of a wing-nut forming die carried by the framework, a placer punch carried by the header plunger, and a wing-nut forming die also carried by the header plunger, the punch and header-plunger-carried die being mounted to alternately cooperate with the framework-carried die during the regular reciprocation of the header plunger for first positioning a blank in engagement with the framework-carried die and then shaping the blank by the action of the plunger-carried die relative to the framework-carried die.

12. The combination as claimed in claim 11 with means carried by the framework-carried die for clamping a blank in cooperative relation to the last-named die.

13. The combination as claimed in claim 11 with retaining means for sustaining a wing-nut blank in cooperative alinement with the framework-carried die from the time such blank is so placed by the punch until the blank is engaged by the header-plunger-carried die.

14. The combination as claimed in claim 11 with means for feeding a wing-nut blank between the plunger and the framework-carried die.

15. In a machine for forming wing nuts from blanks having bulbous bodies and oppositely extending arms, the combination with forming dies of means for feeding the blanks downward in generally upstanding attitudes to a transfer point alongside one of the dies, and a blank receiving and transferring device for receiving the blanks individually at the transfer point and transferring them into register with said die, said transfer device having a wide upper portion for receiving the bulbous body of the blank and a clamp beneath said upper portion composed of relatively movable jaws adapted to grip and partially embrace the lower arm of the blank, means for holding the jaws separated when the transfer device is in blank receiving position to facilitate the entry of a canted blank between the jaws, and means for closing the jaws to straighten the canted blank.

16. In a machine for forming wing nuts from blanks having bulbous bodies and oppositely extending arms, the combination with forming dies of means for feeding the blanks downward in generally upstanding attitudes to a transfer point alongside one of the dies, and a blank receiving and transferring device for receiving the blanks individually at the transfer point and transferring them into register with said die, said transfer device having a wide upper portion for receiving the bulbous body of the blank and a clamp beneath said upper portion composed of relatively movable jaws adapted to grip and partially embrace the lower arm of the blank, one of said jaws being mounted on the other, a spring urging the jaws together, and means for intercepting and arresting the carried jaw to separate the jaws as the jaws approach blank receiving position, to facilitate the entry of a canted blank between the jaws, said spring being effective as the device moves away from blank receiving position to cause relative approach of the jaws to straighten the canted blank.

17. A machine as set forth in claim 16 wherein provision is made of means operating above the clamp for driving the blank from between the clamp jaws against the yielding resistance of the spring when the transfer device has carried the blank into die registering position.

18. A machine as set forth in claim 16 including means operating above the clamp for driving the blank from between the clamp jaws against yielding resistance of the spring when the transfer device has carried the blank into die registering position, and means for causing the transfer device to start its return for another blank before the blank driving means has been moved back to clear the path of the transfer device, the transfer device being open at its forward end above the clamp to permit escape of the blank driving means.

19. In a machine for forming wing nuts from blanks having bulbous bodies and oppositely extending arms, the combination, with forming dies, of a tube for feeding the blanks downward in generally upstanding attitudes to a transfer point alongside a die, and a blank receiving end transferring device for receiving the blanks individually at the transfer point and transferring them into register with the die, said transfer device being formed at its leading end to receive a blank discharged substantially lengthwise by the tube, and including means to intercept the leading end of the blank in a position such that the trailing end of said blank supports the leading end of a following blank substantially flush with the mouth of the tube, and said transfer device also including a member having an upper surface which travels across the mouth of the tube and prevents descent of the following blank during a transferring operation.

20. In a machine for forming wing nuts from blanks having bulbous bodies and oppositely extending arms, the combination with forming dies of a tube for feeding the blanks downward in generally upstanding attitudes to a transfer point alongside a die, and a blank receiving and transferring device for receiving the blanks individually at the transfer point and transferring them into register with the die, said transfer device serving both as a carrier for the blank received and as a separator to restrain the next following blank in the tube until the completion of an operating cycle of the transfer device.

21. In nut blank stamping apparatus, the combination, with reciprocating wing-nut stamping means shaped, proportioned and adapted for operating on wing-nut blanks of the type having a bulbous middle enlargement and longitudinal arms outstanding therefrom, of a reciprocating carrier for bodily carrying wing-nut blanks for delivering such blanks to the stamping means, the carrier having a main plate and a resiliently movable jaw spaced with respect to the plate sufficiently for accommodating an arm of the blank between the jaw and plate, the carrier having a support for the blank located to be engaged by the lower end of said arm when disposed between the jaw and plate for sustaining the blank in an upright position with the bulbous enlargement out of the line of the jaw, whereby a wing-nut blank of the type stated is adapted to be received, carried, and released by said carrier with the blank in an upright position, and means for feeding said nut blanks in an upright position to the carrier successively one at a time in timed relation to the reciprocation thereof.

22. In nut-forming attachments for standard headers, the combination, with header mechanism, of co-operating dies carried thereby, one to reciprocate and the other to remain stationary, one of said dies being formed with a tapering end having longitudinal grooves in opposite sides thereof, so that a wing nut blank may be forged about its exterior.

23. In apparatus for cold forging wing-nut blanks, the combination of a matrix or internal die and a cooperating plunger die adapted to bend a blank in the matrix die, the plunger die being exteriorly shaped to conform generally with the contour of unfinished wings and other parts of a wing-nut blank, whereby the bending operation of the plunger die causes the blank in the matrix die to be shaped about and enclose external parts of the plunger die.

24. The combination as claimed in claim 23 wherein the plunger and matrix dies are proportioned to cause the wing-nut blank to have its wing forming arms extend along and engage opposite portions of the plunger die while the body of the wing-nut blank abuts the inner or free terminus of the plunger die.

HEYMAN ROSENBERG.